(No Model.)
S. E. BALL.
CANDY MOLD.
No. 449,869. Patented Apr. 7, 1891.
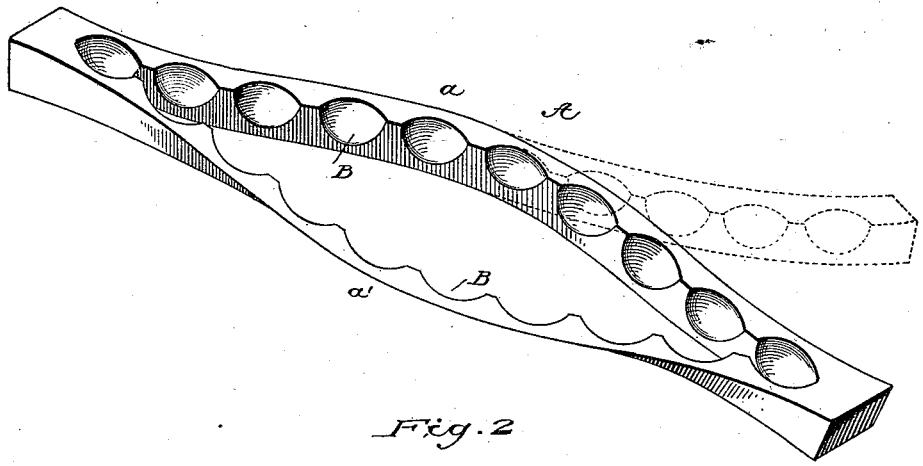
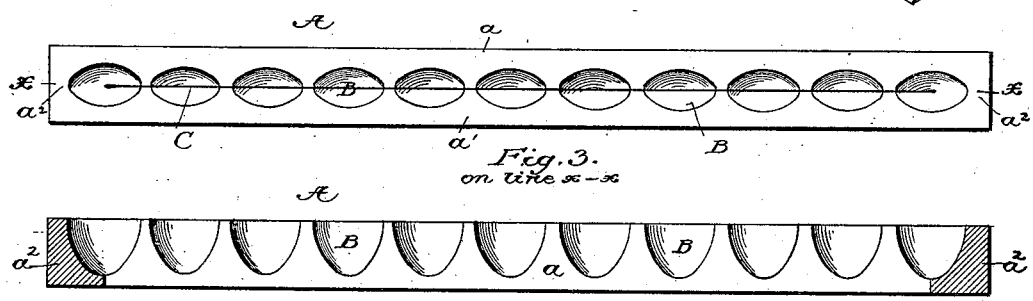
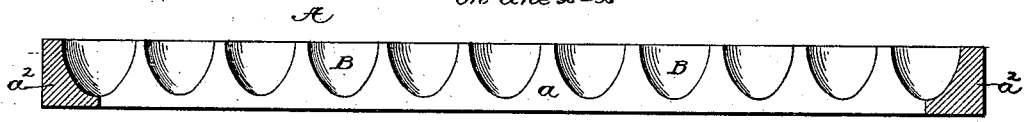
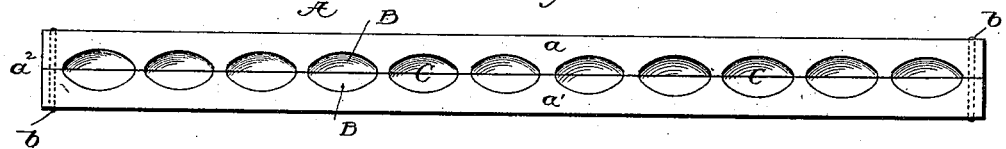
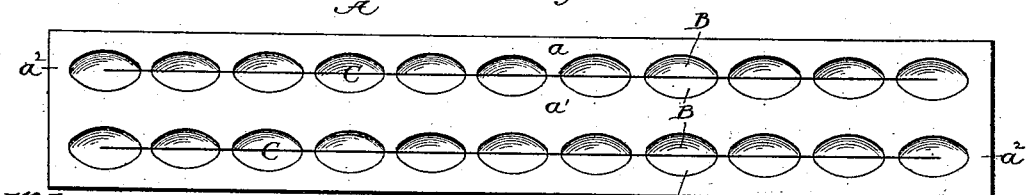
Witnesses:
N. N. Mortimer
H. R. Kennedy
Inventor:
Saml. E. Ball
By P. T. Dodge
Atty.

UNITED STATES PATENT OFFICE.

SAMUEL E. BALL, OF DAYTON, OHIO, ASSIGNOR TO THE NATIONAL CANDY MOLD COMPANY, OF SAME PLACE.

CANDY-MOLD.

SPECIFICATION forming part of Letters Patent No. 449,869, dated April 7, 1891.

Application filed December 31, 1890. Serial No. 376,369. (No model.)

*To all whom it may concern:*

Be it known that I, SAMUEL E. BALL, of Dayton, in the county of Montgomery and State of Ohio, have invented certain Improvements in Candy-Molds, of which the following is a specification.

This invention relates to a hand-mold intended more particularly for use in the molding of cream or fondant. In the patent granted to me February 26, 1889, No. 398,368, a mold of this character is shown and described as consisting of a series of unconnected strips or bars formed of india-rubber adapted to be laid side by side and having complementary cavities or indentations in their proximate faces to form mold-cells.

The present invention embodies substantially the same construction, but in addition provides for the connection at one or both ends or between their ends of the bars containing the complementary cavities, so that these bars while being capable of separation and manipulation to discharge the molded article will at all times be connected together, thus facilitating their handling and avoiding the possibility of confusion which would arise from mismatching, &c.

In the accompanying drawings, Figure 1 is a perspective view of my improved mold in its preferred form, showing the members separated between their ends to discharge their contents. Fig. 2 is a plan view of the same with the members in contact, forming the mold-cells. Fig. 3 is a longitudinal vertical section on the line $x\ x$ of Fig. 2. Fig. 4 is a plan view showing the ends of the strips connected by means of pins. Fig. 5 is a plan view showing a series of connected strips containing complementary cavities in their proximate faces. Fig. 6 is a plan view showing the members connected between their ends.

Referring to Figs. 1, 2, and 3, A is a hand-mold of india-rubber or other suitable flexible material, consisting of two strips $a\ a'$, connected together at their ends, as at $a^2$. These strips are provided in their proximate faces with cavities or indentations B, so that when the strips are brought together, as shown in Fig. 2, the cavities will register, forming mold-cells C, as shown, for the reception of the material designed to compose the molded product, which, on the separation of the strips, may be discharged without mutilation.

In constructing the mold a single strip or bar of rubber may be formed with the series of complete cells and subsequently split or separated between its ends through the cells, or, as shown in Fig. 4, the mold may be formed by connecting the ends of two independent strips containing the cavities in their proximate faces by means of pins $b$.

As shown in Fig. 5, the mold may consist of a number of strips connected at their ends. When the mold is constructed in this manner the strips will at all times be in readiness to be properly and readily assembled to form the mold-cells. At the same time they may be separated, twisted, stretched, or otherwise manipulated to discharge the product.

As shown in Fig. 6, the bars may be connected together between their ends and substantially the same results secured as when connected at one or both ends, and it is to be understood that my invention is intended to embrace all these different forms of construction, the essence of the invention consisting of two or more strips containing complementary cells in their proximate faces and connected together at one or both ends or between their ends.

I do not deem it essential that the strips shall be connected at both ends, as they may be connected at one end only, the other ends being free, as shown by dotted lines in Fig. 1.

Under the construction set forth all the advantages attending the use of disconnected bars, as far as twisting, stretching, and otherwise manipulating the same to discharge the molded product is concerned, are secured, and, in addition, the handling of the bars is greatly facilitated, both in the process of molding and transportation. The cavities will register truly under all conditions, there being no liability of the strips shifting relatively, and confusion is avoided which would arise on account of the mismatching of strips containing cells of different forms.

Having thus described my invention, what I claim is—

1. The candy-mold consisting of two or more flexible bars provided with complementary cells and connected together in such manner as to admit of the separation of a portion of the bars to discharge the article.

2. The candy-mold consisting of the series of india-rubber bars provided with complementary cells and connected together at their ends.

In testimony whereof I hereunto set my hand, this 23d day of December, 1890, in the presence of two attesting witnesses.

SAMUEL E. BALL.

Witnesses:
    WARREN MUNGER,
    GRAFTON C. KENNEDY.